Nov. 28, 1933.  A. M. NIVEN  1,937,123
SLEEVE VALVE ENGINE
Filed April 11, 1927  2 Sheets-Sheet 1
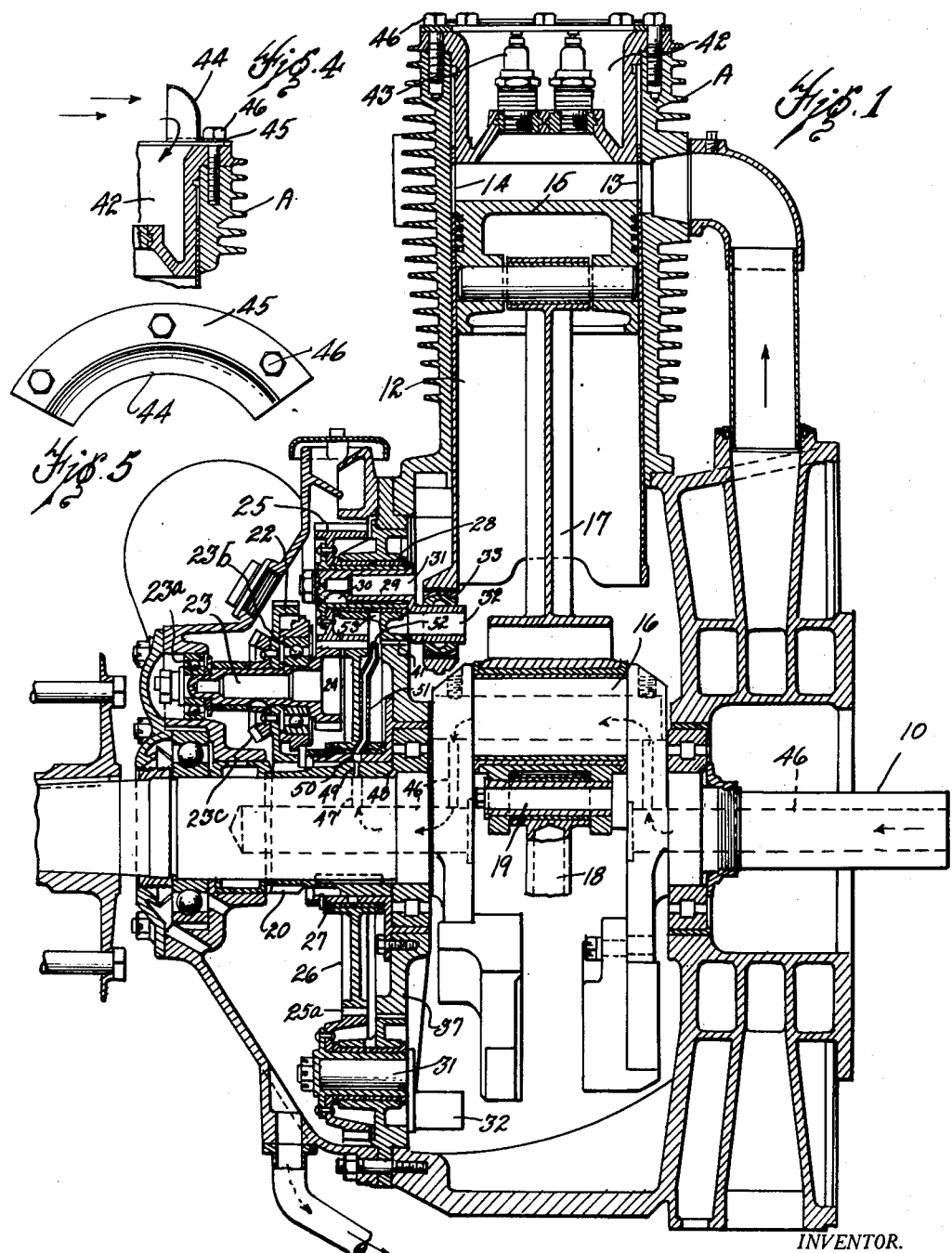
INVENTOR.
ARCHIE MACPHAIL NIVEN
BY
ATTORNEY.

Nov. 28, 1933.    A. M. NIVEN    1,937,123
SLEEVE VALVE ENGINE
Filed April 11, 1927    2 Sheets-Sheet 2
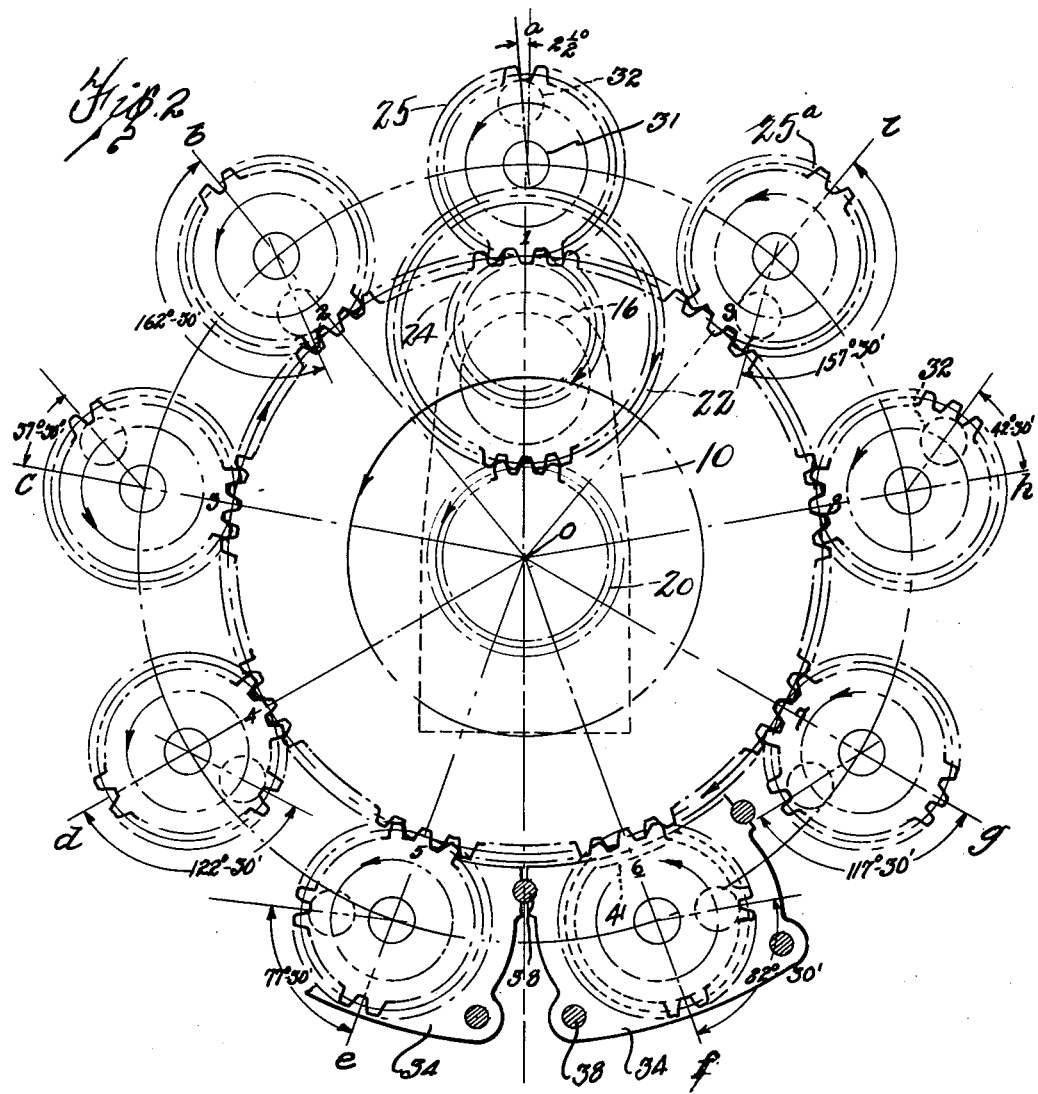
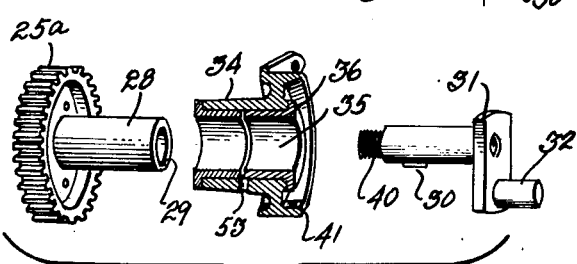
INVENTOR.
ARCHIE MACPHAIL NIVEN
BY
ATTORNEY.

Patented Nov. 28, 1933

1,937,123

UNITED STATES PATENT OFFICE 1,937,123

SLEEVE VALVE ENGINE

Archie Macphail Niven, Detroit, Mich., assignor to Continental Motors Corporation, Detroit, Mich., a corporation of Virginia Application April 11, 1927. Serial No. 182,549

57 Claims. (Cl. 123—55)

This invention relates to internal combustion engines and refers more particularly to engines having a plurality of cylinders arranged radially. This type of engine is commonly used in airplanes and aircraft but it is not my intention to so limit the use of my improvements.

My invention further relates to that type of engine commonly referred to as the single sleeve valve engine and resides in part in the provision of reduction gearing acting between the crank shaft and the various sleeve valves whereby the sleeves may be operated in timed relation with the crankshaft to control the engine intake and exhaust ports. I have illustrated my invention in connection with a sleeve valve engine wherein each sleeve is moved in a combined reciprocating and oscillating travel so that a point on the sleeve valve travels in the path of a closed curve with respect to the cylinder. Heretofore a sleeve valve radial engine has been proposed wherein the sleeves of this general character were driven by a direct contact of spiral gears respectively operating on the crank shaft and sleeve valve crank pin but such type of engine has proved unsatisfactory.

I have provided a novel reduction gearing drive between the crank shaft and sleeve valve preferably employing spur gears. My invention also provides a plurality of similar gear drive units capable of convenient assembly which is an important factor in manufacturing engines. I have further provided an engine of the character referred to in which the gearing is arranged to provide a convenient and novel method of timing the various cylinders.

A still further feature of my invention resides in providing novel means for lubricating the sleeve valve driving mechanism.

A still further object of my invention resides in providing means for cooling the cylinder heads and spark plugs by deflecting air toward these parts.

With the foregoing and other objects in view my invention further resides in the novel combination and arrangement of parts more particularly hereinafter described.

Referring to the drawings in which like reference characters indicate corresponding parts, Fig. 1 is a sectional elevation view of one embodiment of my engine showing one of the cylinders in cross section, Fig. 2 is a diagrammatic view of the driving mechanism for the sleeve valves illustrating one manner of timing the various valves, Fig. 3 is a perspective view of one of the actuator units for the sleeve valves, Fig. 4 is a fragmentary sectional view of a cylinder showing my improved means for cooling the cylinder heads, and Fig. 5 is a plan view of the wind deflector shown in Fig. 4.

In the drawings reference character A represents one of the cylinders radially disposed around the crank shaft 10, any number of cylinders (preferably an odd number) being arranged for example as shown in Fig. 2, nine cylinder axes being illustrated by the lines o—a, o—b, o—c, o—d, o—e, o—f, o—g, o—h, and o—i. In Fig. 1, the typical cylinder A is provided with sleeve valve 12 having suitable intake and exhaust ports 13 and 14 respectively, 15 representing the piston. The ports 13 and 14 are preferably generally arranged and constructed in multiple fashion circumferentially about each sleeve according to well known design at this time in single sleeve valve engines of the combined oscillating and reciprocating type. The crank shaft may be formed with a crank 16. Any desired form of connection between the crank shaft and pistons may be employed, that illustrated being of the well known articulated rod type in which 17 is the master rod, the remaining rods 18 being pivoted thereon as at 19.

In order to impart the desired movement to the sleeve valves, a main driving pinion 20 is fixed to the crankshaft as by a key 21, this pinion in turn driving a layshaft gear 22 fixed to layshaft 23 mounted in suitable bearings 23ª and 23ᵇ. The usual auxiliaries for the engine may be driven from gear 23ᶜ. The layshaft is provided with a pinion 24 driving a master sleeve gear 25 which has a face sufficient to engage an idler gear 26 freely revolvable on bearing 27 about the crank shaft, said bearing being carried by the division wall 37 and secured thereto by bolts or other suitable fastening devices. It may be further noted that the idler gear 26 mounted on the bearing 27, is concentrically positioned with respect to the crankshaft and is operatively connected therewith by the train of gears 25, 24, 22 and 20, the gear or pinion 20 being keyed to the crankshaft. This idler gear 26 serves to drive sleeve gears 25ª spaced about the periphery of the idler gear according to the number of cylinders, the master gear 25 differing from gears 25ª only in the width of face for engagement with pinion 24. The sleeve gears may each be fixed to a hub 28 having an internal keyway 29 for receiving the key 30 carried by the sleeve crank 31. The crank 31 carries a crank pin 32 connected as by a ball and socket 33 to a sleeve valve 12, the pin 32 being slidable in the ball to permit the slight arcuate or oscillating movement of the sleeve. The hub 28 may be centered in a bearing 34, one or more bushings 35 with flanged ends 36 being provided for convenience of assembly. The bearings 34 are properly located about the frame or division wall 37 fixed thereto by bolts 38 engaging flanges of the bearing. One feature of my invention resides in providing a plurality of similar sleeve drive units the parts of each being adapted to be assembled and placed as a unit in the proper position to drive the sleeve. Such a unit may consist of bearing 34, bushings 35, sleeve gear 25$^a$ with the hub 28 and sleeve crank 31, a nut 39 engaging threads 40 serving to hold the parts in assembled relation. Where the gear ratios and other proportions are such that in assembling these units into position the bracket bearing 34 does not clear the teeth of pinion 24 and idler gear 26, then the bearing 34 may be curved or indented inwardly at 41 sufficient to clear these parts.

Any desired ratios of drive may be employed between the crankshaft and sleeve valves within the broad scope of my invention and for purposes of making a full disclosure of one typical engine embodying the features of my invention, I have provided pinion 20 with 27 teeth and gear 22 with 36 teeth thus driving the layshaft 23 at ¾ crankshaft speed; pinion 24 and gear 25 have 18 and 27 teeth respectively thus driving the sleeve shaft 31 at ½ crankshaft speed; the idler gear 26 being provided with 31 teeth which thereby moves at ⅙ crankshaft speed. The arrows in Fig. 2 indicate the direction of rotation. I have found it convenient from a production standpoint and with other considerations in mind to make the number of teeth in the sleeve gears 25$^a$ a whole number multiple of the number of cylinders. For example in the engine illustrated where nine cylinders are employed the sleeve gears have 27 teeth (9×3=27). Thus in order to time the engine it is only necessary to retard each gear 3 teeth (27÷9=3) in relation to the previous cylinder in the desired order of firing. For example starting with any one cylinder, the master gear cylinder o—a for convenience, with the piston at top dead center of compression stroke, then the sleeve unit is inserted into the casing and sleeve with its sleeve crank pin 32 at top dead center. The next cylinder to fire, in the illustrated firing order, is o—c so that the actuating unit for the sleeve associated with this cylinder is inserted in place, the sleeve crank pin 32 of such unit being turned backward in relation to the previously timed cylinder 3 teeth or 40°

$$\left(\frac{360°}{27} \times 3 = 13° \ 20' \times 3 = 40°\right).$$

The firing order illustrated in Fig. 2 considering cylinder o—a as No. 1 and reading clockwise, is Nos. 1—3—5—7—9—2—4—6—8. Thus the next cylinder to be timed is No. 5 or o—e, the sleeve unit for this cylinder being inserted into position, the crank pin being retarded 3 teeth relative to the last timed cylinder No. 3 or o—c; or 6 teeth relative to next preceding cylinder No. 1 or o—a. This process is followed out for the total number of cylinders for arriving at proper engine timing. The following table will serve to illustrate the retardation of the successive sleeve crank pins, from the first timed cylinder in a nine cylinder engine proportioned as shown with gear ratios and firing order illustrated.

| Cylinder | Degrees | Cylinder | Degrees |
|---|---|---|---|
| No. 1 | 0° 0′ | No. 2 | 200° 0′ |
| No. 3 | 40° 0′ | No. 4 | 240° 0′ |
| No. 5 | 80° 0′ | No. 6 | 280° 0′ |
| No. 7 | 120° 0′ | No. 8 | 320° 0′ |
| No. 9 | 160° 0′ | | |

In actual production the proper tooth of each of the sleeve gears of the drive units for engagement with the idler gear 26, is predetermined with respect to the crank pins 32 and the firing order of the cylinders and successive numbers or timing marks as shown in Fig. 2 are placed on the sleeve gears making it unnecessary to count the teeth in assembly. In Fig. 2 it will be noted that the relative retardation of the sleeve gears differs slightly from the degrees of retardation outlined in the foregoing table. This variation is shown in increments of a small amount such as 2½° with the parts illustrated starting with the master cylinder o—a and is desirable in a single sleeve valve engine of the type illustrated where the ports of each sleeve are to be cut alike in order that the ports of each sleeve may be located in line circumferentially, a method termed "port balancing" broadly known in connection with this general type of single sleeve valve engine where the cylinders are arranged tandem as in automotive practice. Thus while this advance for port balancing is not essential it is desirable from a standpoint of machining the ports of the sleeve valve. If desired this increment of advance might be omitted and the ports arranged in an unbalanced position; or the ports of the sleeves may be designed to function properly without being in line circumferentially as will be readily understood by one skilled in this art.

Thus a table corresponding to the foregoing but showing the allowance for port balancing might be substantially as follows with respect to the first timed cylinder with the gear ratios and firing order and other parts proportioned as illustrated:

| Cylinder | Degrees |
|---|---|
| No. 1 | 2° 30′ advancement |
| No. 3 | 37° 30′ retardation |
| No. 5 | 77° 30′ retardation |
| No. 7 | 117° 30′ retardation |
| No. 9 | 157° 30′ retardation |
| No. 2 | 197° 30′ retardation |
| No. 4 | 237° 30′ retardation |
| No. 6 | 277° 30′ retardation |
| No. 8 | 317° 30′ retardation |

In Fig. 2 the timing marks on the sleeve gears are shown for location of the sleeve drive units in accordance with the above table. In the above table the relative timing of the cylinders is just the same as in the preceding table since all of the sleeve cranks have been advanced 2½°. The balancing of the ports is obtained by reason of each sleeve being advanced 2½° relative to its associated piston.

I also desire to point out a still further variation in the engine timing where articulated connecting rods are employed. In this type of engine it is generally well known that each crank or knuckle pin 19 describes a slightly different path of travel owing to the fact that the pin centers are offset from the master rod axis or crank pin axis. This results in slightly different piston velocities at the same angular position of crank in each cylinder, an inherent variation from the computed timing results. In existing poppet valve radial engines no attempt is made to remedy this fault as ordinarily one cam is used for operating the valves of more than one cylinder, different cams for the valves of each cylinder being impractical. However, with my invention this timing discrepancy may be reduced to a negligible quantity for all practicable purposes by slightly altering the relative position of the sleeve gears with respect to the idler gear and therefore with respect to the crankshaft and pistons. It should be understood however, that the engine timed as shown in Fig. 2 without any allowance for the articulated rods where used, is quite satisfactory, this additional allowance being a further refinement in the engine timing made possible by my invention. Furthermore where articulated rods are not used this refinement may also be disregarded. Such further alteration is made to correct the timing variation to the nearest tooth in the valve gears. While this factor may be computed I have found it more convenient on a "cut and try" basis especially since the accuracy is limited to the nearest tooth on the sleeve gear. A table corresponding to the foregoing but with corrections added to the foregoing table or the timing shown in Fig. 2 for the articulated rods, where employed, might be substantially as follows, for example for the particular engine illustrated:

| Cylinder | Degrees |
| --- | --- |
| No. 1 | 2° 30′ (No change) |
| No. 3 | 50° 50′ (1 tooth clockwise) |
| No. 5 | 77° 30′ (no change) |
| No. 7 | 104° 10′ (1 tooth counterclockwise) |
| No. 9 | 144° 10′ (1 tooth counterclockwise) |
| No. 2 | 210° 50′ (1 tooth clockwise) |
| No. 4 | 250° 50′ (1 tooth clockwise) |
| No. 6 | 277° 30′ (No change) |
| No. 8 | 304° 10′ (1 tooth counterclockwise) |

Once these figures are determined the timing marks on the sleeve gears may be located and the next engines built may be readily timed by corresponding timing marks on the sleeve gears of the various sleeve drive units as well. This compensation of course destroys the benefit obtained by the timing alteration for port balancing but generally more nearly affords maximum efficiency with the sleeves all alike. Obviously instead of following my method each of the sleeves may be constructed to adapt the ports to meet the conditions of articulation for each cylinder but my method provides a practical compensation for the alterations in timing due to articulation.

Referring to Figs. 4 and 5 the cylinder heads A may be formed concave or recessed at 42 according to general practice in sleeve valve engines. In order to additionally maintain the cylinder heads and spark plugs 43 cool, I may provide the arcuate deflectors 44 for the cylinders conveniently formed with a flange 45 secured in position by the usual cylinder head bolts 46. These deflectors when used in connection with aircraft will be faced toward the direction of motion or in the slip stream indicated by the arrows in Fig. 4 whereby the air will be deflected into the cylinder head recesses 42 and caused to circulate thereabout serving to additionally cool the cylinder heads and spark plugs.

A further feature of my invention resides in the provision of means for lubricating the sleeve drive gears and parts associated therewith. To this end the crankshaft 10 may be formed with a conduit 46 for passage of lubricant in the direction of the dotted arrows in Fig. 1 to the outlet 47. The hub 48 of pinion 20 is formed with a radial passage 49 communicating with peripheral groove 50 in the bearing 27. The idler gear 26 carries a tube 51 with a nozzle 52 directed toward the parts to be lubricated. The bearings 34 are each provided with an opening 53 admitting lubricant to the bushing 35, best shown in Fig. 3.

An important feature of my invention is the particular construction of the crank case and gear case cover, the division wall 37 being interposed therebetween. In order to facilitate the assembly of the various engine units with an engine of this type, the division wall is made of a separate member but such wall could be cast integral with the gear case cover if so desired. The division wall separating the interior of the gear case from the crank case carries the bearing means for supporting the crank shaft and the valve operating mechanism. Other driving mechanisms could be also supported in bearing means carried by the division wall if found desirable to do so. An advantage in using a separate division wall is that access may be had more readily to the driving mechanisms carried by the wall and housed in the gear case upon removing the gear case cover.

In operation as the crankshaft rotates lubricant under pressure will pass from passage 47 through passage 49 whenever these passages are in registration, the lubricant thence being conducted through opening 50 to pipe 51. The latter pipe revolving with the idler gear 26 will thus discharge lubricant from nozzle 52 to the various sleeve actuator bearings 34 and will also be deflected and sprayed over the various gears and bearings comprising the reduction gearing between the crankshaft and the sleeves.

It will be apparent that I have provided a single sleeve valve engine of the radial type in which the sleeves are operated in timed relation with the crankshaft through a reduction gearing between the crankshaft driving pinion and the sleeve drive gear, my invention being especially directed to a single sleeve valve engine in which the sleeves are given a combined reciprocating and oscillating movement with respect to each cylinder axis.

A further broadly novel feature of my invention resides in the provision of the sleeve drive units which may be made alike and assembled as units into position. As stated heretofore the master drive unit only preferably differs from the others in the width of the sleeve gear which serves to drive the idler gear. Obviously if it is desired to drive the idler gear at more than one point then units similar to the master drive unit may be substituted for the sleeve drive units at the desired points.

I furthermore do not limit the scope of my invention to any specific gear ratios or timing or firing order since these and other quantities set forth hereinbefore will vary according to conditions in any given set of requirements. It is sometimes desired to operate the sleeve valves on other than the generally customary four stroke cycle in which event it will be desirable to change the net gear ratio accordingly.

Other features of my invention reside in the method of timing an engine of the single sleeve valve type and furthermore, when connecting rods of the articulated type are employed or where other factors make it advisable, I have provided a novel method of compensating for the inherent timing variations.

I have also provided a novel means for lubricating the sleeve driving mechanism.

Many modifications may be made within the general scope of my invention and I do not desire to limit myself except as specifically pointed out in the claims.

What I claim as my invention is:

1. In a sleeve valve engine of the character described the combination with a crankshaft and a plurality of ported cylinders disposed radially about the crankshaft, each cylinder having a piston operatively connected to the crankshaft, a ported sleeve valve associated with each cylinder, a driving member carried by the crankshaft, means connected with each sleeve for directing movement of the sleeve in a combined reciprocating and oscillating path whereby the sleeve ports and the ports of the associated cylinder will cooperate to control the admission of fuel to the cylinder and the exhaust of gas from the cylinder, and a reduction mechanism transmitting the drive from the said crankshaft driving member to the said means, said reduction mechanism including a gear concentric with the crankshaft but independently rotatable therefrom and arranged to drive the said means.

2. In a sleeve valve engine of the character described the combination with a crankshaft and a plurality of ported cylinders disposed radially about the crankshaft, each cylinder having a piston operatively connected to the crankshaft, a ported sleeve valve associated with each cylinder, a driving member carried by the crankshaft, means connected with each sleeve for directing movement of the sleeve in a combined reciprocating and oscillating path whereby the sleeve ports and the ports of the associated cylinder will cooperate to control the admission of fuel to the cylinder and the exhaust of gas from the cylinder, a reduction mechanism transmitting the drive from the said crankshaft driving member to the said means, said reduction mechanism including a layshaft receiving the drive from the crankshaft, and an idler gear driven by the layshaft and adapted to drive the said sleeve moving means.

3. An internal combustion engine comprising a crankshaft, a plurality of cylinders radially disposed about the crankshaft, a piston operable in each cylinder, means connecting the pistons and crankshaft, single sleeve valve means associated with each cylinder, and spur gear reduction mechanism between the crankshaft and sleeve valve means, said mechanism including a layshaft driven from the crankshaft and an idler gear driven from the layshaft and driving the sleeve valve means for the cylinders.

4. An internal combustion engine comprising a crankshaft, a plurality of cylinders radially disposed about the crankshaft, a piston operable in each cylinder, means connecting the pistons and crankshaft, sleeve valve means associated with each cylinder, and spur gear reduction mechanism between the crankshaft and sleeve valve means, said mechanism including a layshaft driven from the crankshaft and an idler gear driven from the layshaft and driving the sleeve valve means for the cylinders to impart to each sleeve a combined reciprocation and oscillation with respect to each cylinder axis respectively.

5. An internal combustion engine comprising a crankshaft, a plurality of cylinders radially disposed about the crankshaft, a piston operable in each cylinder, means connecting the pistons and crankshaft, single sleeve valve means associated with each cylinder and means for driving the sleeves in a combined reciprocating and oscillating path from the crankshaft including a layshaft and a plurality of substantially similar sleeve drive units each including a sleeve crank, sleeve gear and bearing for the crank and gear, the sleeve gear of one of said units being driven directly by said layshaft, and means driving other of the sleeve gears indirectly from the layshaft.

6. A sleeve valve engine comprising a crankshaft, a division frame member extending substantially perpendicular to the axis of the crankshaft, a plurality of cylinders and associated single sleeve valves positioned radially about the crank shaft on one side of said frame member, sleeve valve gearing operatively connected to the crankshaft on the other side of said frame member, and means extending through said frame member for driving the sleeves from the gearing.

7. A single sleeve valve engine of the character described comprising a crankshaft, a division frame member extending substantially perpendicular to the axis of the crankshaft, a plurality of cylinders and associated sleeve valves positioned radially about the crankshaft on one side of said frame member, sleeve valve gearing operatively connected to the crankshaft on the other side of said frame member, and means extending through said frame member for driving the sleeves from the gearing, said means comprising a plurality of sleeve driving units each including a bearing member, said frame member having a series of openings spaced around the crankshaft for receiving said bearing members.

8. A single sleeve valve engine comprising a crankshaft, a division frame member extending substantially perpendicular to the axis of the crankshaft, a plurality of cylinders and associated sleeve valves positioned radially about the crankshaft on one said of said frame member, sleeve valve gearing operatively connected to the crankshaft on the other side of said frame member, and means extending through said frame member for driving the sleeves from the gearing, said means comprising a plurality of sleeve driving units each including a bearing member, said frame member having a series of openings spaced around the crankshaft for receiving said bearing members said bearing members having an indented portion adapted to permit insertion of the units in the said openings of the frame member without interference with the said sleeve valve gearing.

9. In an internal combustion engine having a plurality of cylinders radially positioned about a crankshaft, single sleeve valves for the cylinders and means for driving the sleeves from the crankshaft including a multi-toothed sleeve gear operatively associated with the sleeve valve of each cylinder, the number of teeth on each sleeve gear being a whole number multiple of the number of cylinders, said sleeve driving means including a driving element actuated by the crankshaft and adapted to drive said multi-tooth gears.

10. The method of timing a single sleeve valve radial engine including a driving gear and sleeve gears driven from the driving gear at intervals around said driving gear, consisting in inserting the sleeve gears into position with corresponding teeth on the sleeve gears successively retarded for the same number of teeth over the preceding sleeve gear in the order of firing.

11. An internal combustion engine comprising a crankshaft, a plurality of ported cylinders disposed radially about said crankshaft, a ported sleeve valve within each cylinder, a piston within each sleeve, means connecting the pistons and crankshaft, driving means operable from the crankshaft at a predetermined speed relative thereto, and sleeve driving means associated with each sleeve for imparting a combined reciprocating and oscillating movement to the sleeves relative to the cylinders axes respectively, the said sleeve driving means associated with each sleeve being operatively connected to the sleeve and also operatively connected with the said driving means in a manner permitting relative adjustment of the several sleeve driving means to permit timing the engine.

12. An internal combustion engine comprising a crankshaft, a plurality of ported cylinders disposed radially about said crankshaft, a ported sleeve valve within each cylinder, a piston within each sleeve, means connecting the pistons and crankshaft, driving means operable from the crankshaft at a predetermined speed relative thereto, and sleeve driving means associated with each sleeve for imparting a combined reciprocating and oscillating movement to the sleeves relative to the cylinders axes respectively, the said sleeve driving means associated with each sleeve being operatively connected to the sleeve and also operatively connected with the said driving means in a manner permitting relative adjustment of the several sleeve driving means to permit timing the engine and also to compensate for aligning the sleeve ports circumferentially.

13. An internal combustion engine comprising a crankshaft, a plurality of ported cylinders disposed radially about said crankshaft, a ported sleeve valve within each cylinder, a piston within each cylinder and sleeve, articulated means connecting some of the pistons and crankshaft, non-articulated means connecting one of the pistons and connecting rods, and mechanism for driving the sleeves from the crankshaft with a combined reciprocating and oscillating movement relative to each cylinder axis, said mechanism including a driving gear for each sleeve each being independently adjustable in the mechanism to independently alter the relative movement of the piston and associated sleeve valve to substantially compensate for piston velocity deviation due to articulation as compared with the velocity of the piston associated with the non-articulated connecting means.

14. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, a reduction mechanism transmitting the drive from the crankshaft driving member to the said sleeve moving means, said reduction mechanism including a single layshaft driven from the crankshaft driving member and transmitting the drive to each of the sleeve moving means.

15. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, a reduction mechanism transmitting the drive from the crankshaft driving member to the said sleeve moving means, said reduction mechanism including a single layshaft driven from the crankshaft driving member and transmitting the drive to each of the sleeve moving means, said layshaft extending parallel with the crankshaft.

16. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, a reduction mechanism transmitting the drive from the crankshaft driving member to the said sleeve moving means, said reduction mechanism including an element surrounding the crankshaft and driven from said crankshaft driving member, said element transmitting the drive to a plurality of the said sleeve moving means.

17. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, said sleeve moving means including a sleeve gear associated with each sleeve and rotatable on an axis parallel with the crankshaft, a reduction mechanism transmitting the drive from the crankshaft driving member to the sleeve gears, said reduction mechanism including a gear surrounding the crankshaft and meshing with said sleeve gears.

18. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, said sleeve moving means including a sleeve gear associated with each sleeve and rotatable on an axis parallel with the crankshaft, a reduction mechanism transmitting the drive from the crankshaft driving member to the sleeve gears, said reduction mechanism including a gear surrounding the crankshaft and meshing with said sleeve gears, and additional gearing between the crankshaft driving member and said gear surrounding the crankshaft.

19. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, said sleeve moving means including a sleeve gear associated with each sleeve and rotatable on an axis parallel with the crankshaft, a reduction mechanism transmitting the drive from the crankshaft driving member to the sleeve gears, said reduction mechanism including a gear surrounding the crankshaft and meshing with said sleeve gears, and a layshaft driven from the crankshaft driving member and driving said surrounding gear through one of said sleeve gears.

20. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, said sleeve moving means including a sleeve gear associated with each sleeve and rotatable on an axis parallel with the crankshaft, a gear surrounding the crankshaft and meshing with said sleeve gears, a layshaft having a gear driven from the crankshaft driving member, said layshaft having a second gear meshing with one of said sleeve gears.

21. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, said sleeve moving means including a sleeve gear associated with each sleeve and rotatable on an axis parallel with the crankshaft, one of said sleeve gears having a face relatively wide in comparison with other of the sleeve gears, a gear surrounding the crankshaft and meshing with said sleeve gears. a layshaft driven from said crankshaft driving member and provided with a gear meshing with said wide-faced gear.

22. A sleeve valve engine comprising in combination, a crankshaft, a division frame member extending substantially perpendicular to the axis of the crankshaft, a plurality of cylinders and associated single sleeve valves having their axes arranged radially about the crankshaft on one side of said frame member, sleeve driving shafts extending transversely through the said frame member and each having a crank on the said side of the frame member driving a sleeve valve associated therewith, a sleeve gear on each sleeve driving shaft located on the other side of the said frame member, a crankshaft driving gear and reduction mechanism intermediate the crankshaft driving gear and said sleeve gears all located on the last said side of the frame member, said reduction mechanism including an idler gear surrounding the crankshaft.

23. A sleeve valve engine comprising in combination, a crank shaft, a plurality of ported cylinders having their axes disposed radially about the crank shaft, each cylinder having a piston operatively connected to the crank shaft, a ported sleeve valve associated concentrically with each cylinder for movement in a combined reciprocating and oscillating path, a driving member carried by the crank shaft, means connected with each sleeve valve for imparting thereto the aforesaid movement whereby the sleeve ports and the ports of the associated cylinder will cooperate to control the admission of fuel to the cylinder and the exhaust of gas from the cylinder, a reduction mechanism transmitting the drive from the crank shaft driving member to the said sleeve moving means, said reduction mechanism including a single layshaft driven from the crank shaft driving member and transmitting the drive directly to one of the sleeve moving means, and driving connections between said driven sleeve moving means and the remaining sleeve moving means.

24. In an internal combustion engine of the radial single sleeve valve type and including a crankshaft and sleeve valve means, the combination with the crankcase of a plate mounted therein, a gear mounted on said plate concentric with the crankshaft axis, sleeve valve operating mechanism supported by said plate and arranged to be operatively connected with said gear and to impart a combined reciprocating and oscillating movement to said sleeve valve means, and means for operatively connecting said gear to the crankshaft.

25. In an internal combustion engine of the radial single sleeve valve type and including a crankshaft and sleeve valve means, the combination with the crankcase, of a plate mounted therein, a common valve operating gear mounted on said plate concentric with the crankshaft axis, sleeve valve cranks rotatably supported by said plate and operatively connected with said gear, said cranks arranged to impart a combined reciprocating and oscillating movement to said sleeve valve means, and means for operatively connecting said gear to the crankshaft.

26. In an internal combustion engine of the radial single sleeve valve type and including a plurality of cylinders, a crankshaft and sleeve valve means for each cylinder, the combination with the crankcase, of a plate mounted therein, a common valve operating gear mounted on said plate concentric with the crankshaft axis, a plurality of sleeve valve cranks driven by said gear and rotatably supported by said plate, said cranks each operatively connected with one of said sleeve valve means for imparting a combined reciprocating and oscillating movement to said sleeve valve means, and means for operatively connecting said gear to the crankshaft.

27. In an internal combustion engine of the radial sleeve valve type including a plurality of cylinders, a crankshaft and sleeve valve means for each cylinder, the combination with the crankcase, of a plate mounted therein, a plurality of sleeve valve operating mechanisms supported by said plate and each operatively connected with one of said sleeve valve means, a driving intermediary supported by said plate concentric with the crankshaft axis and operatively connected with said sleeve valve operating mechanisms, and means for operatively connecting said driving intermediary to the crankshaft.

28. In an internal combustion engine of the radial sleeve valve type including a cylinder, a crankshaft and sleeve valve means for said cylinder, the combination with the crankcase, of a plate mounted therein and extending in a plane perpendicular to the crankshaft axis, a sleeve valve crank rotatably supported by said plate and having an axis extending substantially perpendicular to the plate, and means including a gear mounted concentrically on said plate for operatively connecting said sleeve valve crank with said crankshaft.

29. A sleeve valve engine of the four stroke cycle type comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, said sleeve moving means including a crank associated with each sleeve and rotatable on an axis parallel with the crankshaft, and reduction drive means transmitting the drive from the crankshaft driving member to said crank.

30. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, said sleeve moving means including a crank associated with each sleeve and rotatable on an axis parallel with the crankshaft, and means transmitting the drive from the crankshaft driving member to said crank, said means including a gear surrounding the crankshaft and operatively connected therewith in driving engagement.

31. A sleeve valve engine comprising a crankshaft, a division frame member extending substantially perpendicular to the axis of the crankshaft, a plurality of cylinders and associated sleeve valve means positioned radially about the crankshaft on one side of said frame member, driving means operatively connected to the crankshaft on the other side of said frame member, and crank means extending through said frame member for driving the sleeve valve means from said driving means.

32. A sleeve valve engine comprising a crankshaft, a division frame member extending substantially perpendicular to the axis of the crankshaft, a plurality of cylinders and associated single sleeve valve means having a combined reciprocating and oscillating movement with respect to the cylinder and sleeve axis and positioned radially about the crankshaft on one side of said frame member, driving means operatively connected with the crankshaft and located at the other side of said frame member, and crank means extending through said frame member for operatively connecting said single sleeve valve means with said driving means.

33. A sleeve valve engine comprising a crankshaft, a division frame member extending substantially perpendicular to the axis of the crankshaft, a plurality of cylinders and associated single sleeve valve means having a combined reciprocating and oscillating movement with respect to the cylinder and sleeve axis and positioned radially about the crankshaft on one side of said frame member, driving means operatively connected with the crankshaft and located at the other side of said frame member, and crank means rotatable on an axis parallel with the axis of said crankshaft and extending through said frame member for operatively connecting said single sleeve valve means with said driving means.

34. A sleeve valve engine comprising a crankshaft, a division frame member extending substantially perpendicular to the axis of the crankshaft, a plurality of cylinders and associated single sleeve valve means having a combined reciprocating and oscillating movement with respect to the cylinder and sleeve axis and positioned radially about the crankshaft on one side of said frame member, driving means operatively connected with the crankshaft and located at the other side of said frame member, and crank means rotatably supported by said frame member on an axis parallel with the axis of said crankshaft and extending through said frame member for operatively connecting said single sleeve valve means with said driving means.

35. A sleeve valve engine comprising a crankshaft, a division frame member extending substantially perpendicular to the axis of the crankshaft, a plurality of cylinders and associated single sleeve valve means having a combined reciprocating and oscillating movement with respect to the cylinder and sleeve axis and positioned radially about the crankshaft on one side of said frame member, driving means operatively connected with the crankshaft and located at the other side of said frame member, and a plurality of crank means each rotatably supported by said frame member on an axis parallel with the axis of said crankshaft, the axis of said crank means located substantially equidistant radially from the crankshaft axis, said crank means extending through said frame member for operatively connecting said single sleeve valve means with said driving means.

36. A sleeve valve engine comprising a crankshaft, a division frame member extending substantially perpendicular to the axis of the crankshaft, a plurality of cylinders and associated single sleeve valve means having a combined reciprocating and oscillating movement with respect to the cylinder and sleeve axis and positioned radially about the crankshaft on one side of said frame member, driving means operatively connected with the crankshaft and located at the other side of said frame member, and a plurality of crank means each rotatably supported by said frame member on an axis parallel with the axis of said crankshaft, the axis of said crank means located substantially equidistant radially from the crankshaft axis, and substantially equally angularly spaced, said crank means extending through said frame member for operatively connecting said single sleeve valve means with said driving means.

37. A sleeve valve engine including a crankcase and a crankshaft supported thereby, at least five cylinders and associated single sleeve valve means having a combined reciprocating and oscillating movement and positioned radially about the crankshaft, sleeve valve driving means located within the crankcase and to one side of the plane containing the cylinder and sleeve valve axes, said means operatively connected with said crankshaft and including sleeve valve actuating means having cranks rotatable on an axis parallel with the axis of the crankshaft.

38. A sleeve valve engine including a crankcase and a crankshaft supported thereby, a plurality of cylinders and associated single sleeve valve means having a combined reciprocating and oscillating movement and positioned radially about the crankshaft, sleeve valve driving means positioned within the crankcase and including reduction gearing positioned to one side of the plane containing the cylinder and sleeve valve axes, said means operatively connected with said crankshaft and including sleeve valve actuating means having cranks rotatable on an axis parallel with the axis of the crankshaft.

39. In an internal combustion engine having a plurality of cylinders radially positioned about a crankshaft, single sleeve valve means for the cylinders, and sleeve valve driving means for imparting a combined reciprocating and oscillating movement to said sleeves and including a multi-toothed driving gear having sleeve cranks and operatively associated with the sleeve valve of each cylinder and provided with a predetermined number of teeth of a whole number multiple of the number of cylinders, whereby relatively retardation of successive sleeve cranks in the order of firing of the respective associated cylinders can be obtained by relatively retarding said multi-toothed driving gear a predetermined degree as measured by a predetermined number of teeth determined by dividing the total number of teeth of any of said sleeve gears by the total number of said cylinders, said sleeve valve driving means including a driving element actuated by the crankshaft and adapted to drive said multi-tooth gears.

40. A sleeve valve engine comprising in combination, a crankcase, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, and means connected with each sleeve valve for imparting thereto the aforesaid movement whereby the sleeve ports and the ports of the associated cylinder will cooperate to control the admission of fuel to the cylinder and the exhaust of gas from the cylinder, said sleeve moving means located within the crankcase and including a sleeve actuating member associated with each sleeve and rotatable on an axis parallel with the crankshaft, and a reduction mechanism transmitting the drive from the crankshaft driving member to the sleeve actuating members, said reduction mechanism including a common driving element engaging with said sleeve actuating member.

41. A sleeve valve engine comprising in combination, a crankshaft, a plurality of ported cylinders having their axes disposed radially about the crankshaft, each cylinder having a piston operatively connected to the crankshaft, a ported sleeve valve associated concentrically with each cylinder for movement in a combined reciprocating and oscillating path, a driving member carried by the crankshaft, means connected with each sleeve valve for imparting thereto the aforesaid movement whereby the sleeve ports and the ports of the associated cylinder will cooperate to control the admission of fuel to the cylinder and the exhaust of gas from the cylinder, a reduction mechanism transmitting the drive from the crankshaft driving member to the said sleeve moving means, said reduction mechanism operatively connected with said crankshaft and transmitting the drive directly to one of said sleeve moving means, and driving connections between said driven sleeve moving means and the remaining sleeve moving means.

42. In an internal combustion engine of the fixed radial cylinder type described having in combination with sleeve valve means one for each cylinder, crank means for each sleeve rotatably supported adjacent the several cylinders for operating their respective sleeve valve means and rotatable about an axis parallel with the axis of the engine crankshaft, and driving means operatively connecting said cranks with the engine crankshaft and including a common driving gear adapted for engagement with each of said crank means.

43. In an internal combustion engine of the radial sleeve valve type including a plurality of cylinders, a crankshaft, sleeve valve means for each of said cylinders, a crankcase, crank means for each sleeve rotatable about an axis parallel with axis of the crankshaft and supported within said crankcase, and gearing within the crankcase including a common driving gear adapted for engagement with each of said crank means for operatively connecting said crank means with said crankshaft.

44. In an internal combustion engine of the radial sleeve valve type including at least five cylinders, a crankshaft, sleeve valve means for each of said cylinders, a crankcase, a plurality of sleeve valve actuating means, and reduction driving means operatively connected with said crankshaft including a common driving element adapted for direct engagement with each of said sleeve valve actuating means.

45. In an internal combustion engine of the radial sleeve valve type including at least five cylinders, a crankshaft, sleeve valve gears for each sleeve and each having a crank portion rotatable about an axis parallel with the axis of the crankshaft, said crank portions engaged with said sleeves, and driving means operatively connected with said crankshaft and including a common gear adapted for direct engagement with each of said sleeve valve gears.

46. In a sleeve valve engine of the radial cylinder type and including a crankcase having a wall associated therewith and extending generally in a plane substantially parallel with the engine plane containing the cylinder axes, a crankshaft supported in part by said crankcase and extending through said wall, sleeve valve means, sleeve valve actuating means, and a common operating element operatively connected with said sleeve valve actuating means.

47. In a sleeve valve engine of the radial cylinder type and including a crankcase having a wall associated therewith and extending generally in a plane substantially parallel with the engine plane containing the cylinder axes, a crankshaft supported in part by said crankcase and extending through said wall, sleeve valve means associated with each cylinder, sleeve valve actuating means one for each cylinder, and a common operating element operatively connected with each of said sleeve valve actuating means.

48. In a multi-cylinder internal combustion engine of the radial sleeve valve type and including a crankcase, a crankshaft, sleeve valve means associated with each of said cylinders, said crankcase having a wall associated therewith and extending in a plane substantially parallel with the engine plane containing the cylinder axes, a plurality of sleeve valve actuating means, and driving means operatively connected with said crankshaft and including a common driving element constructed for operative connection with each of said sleeve valve actuating means, said common driving element operatively supported by said wall.

49. In a multi-cylinder internal combustion engine of the radial sleeve valve type and including a crankcase, a crankshaft, sleeve valve means associated with each of said cylinders, said crankcase having a wall associated therewith and extending in a plane substantially parallel with the engine plane containing the cylinder axes, a plurality of sleeve valve actuating means supported by said wall, and driving means operatively connected with said crankshaft and including reduction gearing and a common driving element constructed for operative connection with each of said sleeve valve actuating means.

50. In a multi-cylinder internal combustion engine of the radial sleeve valve type and including a crankcase, a crankshaft, sleeve valve means associated with each of said cylinders, said crankcase having a wall associated therewith and extending in a plane substantially parallel with the engine plane containing the cylinder axes, a plurality of sleeve valve actuating means, and driving means operatively connected with said crankshaft and including reduction gearing and a common driving element constructed for operative connection with each of said sleeve valve actuating means, said common driving element operatively supported by said wall.

51. In a multi-cylinder internal combustion engine of the radial sleeve valve type and including a crankcase, a crankshaft, sleeve valve means associated with each of said cylinders, said crankcase having a wall associated therewith and extending in a plane substantially parallel with the engine plane containing the cylinder axes, a plurality of sleeve valve actuating means, and driving means operatively connected with said crankshaft and including reduction gearing and a common driving element constructed for operative connection with each of said sleeve valve actuating means, said common driving element operatively supported by said wall on the opposite side thereof from the cylinders.

52. In a multi-cylinder internal combustion engine of the radial sleeve valve type and including a crankcase, a crankshaft, sleeve valve means associated with each of said cylinders, said crankcase having a wall associated therewith and extending in a plane substantially parallel with the engine plane containing the cylinder axes and offset to one side thereof a plurality of sleeve valve actuating means, and driving means operatively connected with said crankshaft and including reduction gearing and a common driving element constructed for operative connection with each of said sleeve valve actuating means, said common driving element and reduction gearing supported on the opposite side of said wall from the cylinders.

53. In a multi-cylinder internal combustion engine of the radial sleeve valve type and including a crankcase, a crankshaft, sleeve valve means associated with each of said cylinders, said crankcase having a wall associated therewith and extending in a plane substantially parallel with the engine plane containing the cylinder axes and offset to one side thereof a plurality of sleeve valve actuating means, and driving means operatively connected with said crankshaft and including reduction gearing and a common driving element constructed for operative connection with each of said sleeve valve actuating means, said common driving element and reduction gearing supported on the opposite side of said wall from the cylinders, said sleeve valve actuating means supported by and extending through said wall.

54. In an internal combustion engine having a plurality of cylinders radially positioned about a crankshaft, sleeve valve means associated with each cylinder, sleeve driving means including a plurality of sleeve gears each having a sleeve actuating crank, a driving gear operatively connected with said crankshaft and adapted to actuate said sleeve gears, the number of teeth on each of said sleeve gears being a whole number multiple of the number of said cylinders, the cranks of said sleeve gears in the order of firing of the respective associated cylinders being relatively and successively angularly spaced an amount equal to the included angular spacing of a number of teeth determined by dividing the total number of teeth of any of said sleeve gears by the total number of said cylinders.

55. In an engine having a crankshaft and at least three engine cylinders disposed radially about the crankshaft, sleeve valve means associated with each cylinder, and sleeve driving means including a plurality of crank elements each connected with one of said sleeve valve means, and means for driving said elements in relatively timed relation from said crankshaft.

56. In an engine having a crankshaft of the single crank type and at least five engine cylinders disposed radially about the crankshaft, sleeve valve means associated with each cylinder, and sleeve driving means including a plurality of crank elements each connected with one of said sleeve valve means, and means including a common driving element for operatively connecting said crank elements in driving relation with respect to said crankshaft.

57. In an internal combustion engine of the sleeve valve type having a crankcase, a crankshaft supported thereby, a wall portion associated with said crankcase, a plurality of cylinders and associated sleeve valve means positioned radially about the crankshaft on one side of the wall portion, sleeve valve operating means driven by said crankshaft and including gearing located to that side of the wall portion remote from the engine plane containing the cylinder axes, and sleeve actuating cranks operatively connected with said gearing and extending through said wall portion, said wall portion provided with bearing means for supporting said crankshaft and said sleeve actuating cranks.

ARCHIE MACPHAIL NIVEN.